US007003942B2

(12) United States Patent
Le Helley et al.

(10) Patent No.: US 7,003,942 B2
(45) Date of Patent: Feb. 28, 2006

(54) SYSTEM AND METHOD OF CONTROLLING PRESSURE OSCILLATIONS OF HYDRODYNAMIC ORIGIN FOR A SOLID PROPELLANT THRUSTER

(75) Inventors: Philippe Le Helley, Pessac (FR); Louis Jacques, Saint Medard en Jalles (FR); Christophe Magniére, Merignac (FR); Gilles Uhrig, Pyla sur Mer (FR); Bernard Bondon, Merignac (FR); Jean-Claude Tricot, Martignas (FR); Didier Boury, Saint Medard en Jalles (FR); Marco Telara, Artena (IT); Paolo Bellomi, Rome (IT); Georgio Mastrangelo, Rome (IT)

(73) Assignees: Snecma Propulsion Solide, Le Haillan (FR); AVIO S.p.A., Turin (IT)

( * ) Notice: Subject to any disclaimer, the term of this patent is extended or adjusted under 35 U.S.C. 154(b) by 109 days.

(21) Appl. No.: 10/648,983

(22) Filed: Aug. 27, 2003

(65) Prior Publication Data

US 2004/0144886 A1 Jul. 29, 2004

(30) Foreign Application Priority Data

Sep. 12, 2002 (FR) .................................. 02 11301

(51) Int. Cl.
*F02K 9/08* (2006.01)
*F02K 9/38* (2006.01)

(52) U.S. Cl. .......................................... 60/219; 60/253

(58) Field of Classification Search .................. 60/204, 60/219, 253, 254, 255; 102/287, 289, 291

See application file for complete search history.

(56) References Cited

U.S. PATENT DOCUMENTS

| | | | | | |
|---|---|---|---|---|---|
| 3,315,472 | A | * | 4/1967 | Moutet et al. | 60/251 |
| 3,327,481 | A | * | 6/1967 | Horvath | 60/255 |
| 3,352,243 | A | * | 11/1967 | Dilchert | 102/287 |
| 3,407,736 | A | * | 10/1968 | Beuschel | 102/291 |
| 3,423,943 | A | * | 1/1969 | Stark | 60/251 |
| 3,795,106 | A | | 3/1974 | Cherry et al. | |
| 4,765,134 | A | * | 8/1988 | Brown et al. | 60/253 |
| 5,367,872 | A | * | 11/1994 | Lund et al. | 60/251 |
| 6,148,610 | A | | 11/2000 | Calabro et al. | 60/253 |

FOREIGN PATENT DOCUMENTS

| | | | |
|---|---|---|---|
| FR | 2 569 234 | | 2/1986 |
| FR | 2 764 645 | A | 12/1998 |
| GB | 1 605 168 | A | 9/1982 |
| RU | 2 147 342 | C | 4/2000 |

* cited by examiner

*Primary Examiner*—Ted Kim
(74) *Attorney, Agent, or Firm*—Weingarten, Schurgin, Gagnebin & Lebovici LLP

(57) ABSTRACT

The invention provides a system for passively controlling pressure oscillations of hydrodynamic origin in a solid propellant thruster comprising a body containing a charge of solid propellant, the system comprising at least one insert disposed in the thruster body transversely relative to the flow direction of the combustion gases of the solid propellant. The insert has an opening of non-axisymmetric shape so as to generate a three-dimensional effect on the flow and prevent axisymmetric turbulent modes from forming in the thruster. Thus, the control system of the invention serves to break the symmetry of the flow and thus prevents axisymmetric turbulence forming which is the source of instability that the present invention seeks to control. The present system is applicable to existing thrusters.

26 Claims, 5 Drawing Sheets

E
30
SOUND
47
SOUND/WALL INTERACTION
41
TURBULENCE FROM WALL
42
TURBULENCE FROM OBSTACLE
43
TURBULENCE/ COMBUSTION INTERACTION
44
TURBULENCE/ WALL INTERACTION
45
TURBULENCE/ NOZZLE INTERACTION
48
UNSTEADY HEAT DISCHARGE
46
SOURCE OF SOUND WAVES
49
UNSTEADY THRUST
31
DYNAMICS OF THE STRUCTURE
FEEDBACK
EXCITERS
FEEDBACK

SYSTEM AND METHOD OF CONTROLLING PRESSURE OSCILLATIONS OF HYDRODYNAMIC ORIGIN FOR A SOLID PROPELLANT THRUSTER

FIELD OF THE INVENTION

The invention relates to the field of solid propellant thrusters, and more particularly it relates to controlling pressure oscillations of hydrodynamic origin that are encountered in this type of thruster.

PRIOR ART

When designing a solid propellant thruster, it is generally necessary to dimension the charge of propellant in such a manner as to produce a desired flow rate or thrust relationship which is defined by prior studies of the complete thruster system as with a missile or a launcher.

The flow rate and thrust depend on the way the shape of the combustion surface varies over time, so the relationship to be implemented can usually only be obtained with complex shapes for the charge, with the simple shape of a central combustion gas exhaust channel being unsuitable.

The special shapes of propellant charges are obtained in some cases by adding two-dimensional patterns such as circumferential fluting distributed along the gas ejection channel. In other cases, the shapes are three-dimensional such as star-shaped patterns. The special conditions associated with very large thrusters of the type used as boosters for space launchers also lead to the charge being implemented in the form of a plurality of blocks. In which case, it is common practice for the front and rear faces of the blocks to be partially or completely inhibited by suitable thermal protection means which are not consumed as quickly as the propellant and which constitute obstacles to flow in the ejection channel.

The geometrical complexity of the initial shape of such blocks and the possible presence of thermal protection means on their faces lead to a variety of geometrical irregularities, such as sharp angles or obstacles that project into the combustion gas ejection channel. Such irregularities lead to turbulent separation occurring in the flow stream, thereby constituting sources of instability. Turbulent detachment is also observed directly at the propellant combustion surface in certain thrusters having a high length/diameter ratio. This contributes in the same manner to the longitudinal instabilities that are observed in the thruster.

These instabilities lead to pressure oscillations which can have various origins and can be characterized by acoustic modes of different kinds being excited (longitudinal modes, tangential modes, radial modes, or cavity modes). In general, hydrodynamic instabilities lead to longitudinal modes. The other modes are excited by other phenomena.

Pressure oscillation phenomena in the engine lead to oscillations in thrust. These lead to dynamic loads on the payload of the launcher that can be harmful thereto. In some cases, it is possible to limit the level of pressure oscillations by acting on the internal shape of such engines.

A first known solution for thrusters consists in creating a constriction in the flow of combustion gas by reducing the flow cross-section for gas in a ring disposed inside the thruster. The purpose of the constriction is to limit or to block soundwaves moving up within the flow. However, the presence of the constriction in the flow leads to a large pressure gradient inside the thruster, which requires the structure of the thruster to be reinforced at its leading end.

Such a modification leads to an increase in the mass of the thruster, and for engines of large size, this becomes penalizing. Furthermore, it has been shown that controlling a "low frequency" (fundamental) acoustic mode in that way can lead to excitation of higher acoustic modes (second or third acoustic modes) being induced by the subcavities created by the diaphragm.

Another known solution consists in optimizing the internal shape of the engine (the shape of the charge and of the channel, the distance from the block to the nozzle, structural elements) by performing successive tests and taking account of the general constraints for the engine.

A first example of such a solution is described in French patent application FR 2 764 645, which relates to thrusters including a charge of solid propellant segmented into at least two blocks for which a charge profile having a large combustion area is required over a portion of the longitudinal extent of the engine. The solution proposed in that document is to move back the large area profile of the charge from its usual position at the front of the engine, towards an intermediate portion of the charge. However, that solution presents the drawback of not being based on any physical principle and, as a result, of requiring testing for its development and to demonstrate its effectiveness, thereby giving rise to considerable development time and expense each time an engine is designed. That solution therefore cannot be applied to an existing engine in which it is desired to reduce the level of pressure oscillations. In addition, it is limited to a restricted part of the field of engines in general, namely to engines having a segmented propellant charge. In addition, the technique used runs the risk of generating pressure oscillations at frequencies that are higher than those of the first longitudinal acoustic modes, which frequencies are harmful to proper operation of the engine. Finally, that solution degrades the construction index by requiring the mass of the internal thermal protection means to be increased.

A second example described in Russian patent application RU 2 147 342 relates to engines in which the charge presents an end face situated at a distance from the rear end wall of the engine. An elastic sleeve surrounds the periphery of the charge in the vicinity of its downstream end face. In the technique recommended in that document, the downstream end face is spaced apart from the nozzle by a distance lying in the range four to 16 times the thickness of the propellant that is to be burned, the sleeve having a diameter of 0.7 to 0.9 times the maximum diameter of the charge. However, as before, that solution is limited to one specific type of engine, i.e. engines in which the charge does not fill the rear vault and presents an end face adjacent to the nozzle, a sleeve being disposed on the periphery of said face. In some cases, the optimum separation and the diameter of the sleeve are to be adjusted by testing. In all cases, the spacing required between the propellant block and the nozzle causes the overall length of the structure to be increased and said length must remain compatible with the general constraints for the engine, and consequently the performance of the engine is degraded because of a considerable additional structural load.

To sum up, prior solutions are limited to restricted fields of application and cannot be retrofitted to existing thrusters. They are concerned only with controlling longitudinal modes. In addition, they can give rise to instabilities appearing at high frequencies while inevitably degrading construction indices by adding mass to the engine as a whole.

OBJECT AND BRIEF SUMMARY OF THE INVENTION

The present invention seeks to remedy the above-mentioned drawbacks and to provide a passive control system for reducing pressure oscillations of hydrodynamic origin in a solid propellant thruster without leading to major modifications to the thruster and without degrading its performance.

These objects are achieved by a system for passively controlling pressure oscillations of hydrodynamic origin in a solid propellant thruster comprising a body containing a charge of solid propellant, the system comprising at least one insert disposed in said thruster body transversely relative to a combustion gas flow channel formed in the solid propellant charge, said insert including a single opening of non-axisymmetric shape that is different from the shape of the gas flow channel so as to generate a three-dimensional effect on the flow in order to prevent axisymmetric turbulent modes from forming in the thruster.

Consequently, with the control system of the invention, an insert presenting a single opening of non-axisymmetric shape different from that of the gas flow channel is placed on the flow path so as to create thereon a three-dimensional effect which breaks the symmetry of the flow and thus prevents the formation of axisymmetric turbulence, which turbulence is a source of the instability that the present invention seeks to overcome.

The three-dimensional effect generated by the insert can be implemented throughout the time the engine is firing or can start from a given instant after initial firing. In which case, the non-axisymmetric opening of the insert is temporarily masked at the beginning of firing so as to appear in the flow subsequently, at a given instant.

In a first embodiment, the non-axisymmetric opening of the insert can be masked from the beginning of firing up to a given instant by an upstream portion of the propellant charge. When the charge is a single block of propellant, the insert is placed inside the block of propellant, which initially presents a flow channel that is inscribed within the non-axisymmetric opening of said insert. Thus, so long as the upstream portion of the block has not been consumed, the three-dimensional effect of the insert does not occur.

For a thruster made up of a plurality of solid propellant blocks, the insert with a non-axisymmetric opening is placed downstream from a block of propellant which presents an initial flow channel diameter which is inscribed within the non-axisymmetric opening of said insert.

In another type of embodiment, the non-axisymmetric opening can be programmed to appear at a given instant after firing by using a geometrical insert of shape that varies during firing.

For this purpose, using a first technique known as "controlled ablation", the insert comprises a first portion made of a first material and a second portion made of a second material and occupying part of the non-axisymmetric opening of the insert, the second material having a rate of ablation that is faster than that of the first material. In another technique referred to as "controlled mechanical rupture", the insert comprises a first portion and a second portion occupying part of the non-axisymmetric opening of the insert, and the second portion is weaker than the first.

The present invention proposes a technical solution to the technical problems of pressure oscillations of hydrodynamic origin which can be adapted to any solid propellant engine, without significantly modifying its performance.

In a thruster having a one-piece propellant charge, the insert is embedded in the charge.

In a thruster having a propellant charge that is segmented into two or more blocks, the insert may be disposed between two blocks in the inter-segment space. When the segmented charge thruster has a block with a top face that is inhibited, the insert may advantageously be placed on the top face of said block so as to act simultaneously to provide thermal protection (block inhibition) and to provide reduction in pressure oscillations.

According to a characteristic of the invention, the opening in the insert is star-shaped.

According to another characteristic of the invention, the opening is of a crenellated shape.

The invention also provides a method of controlling pressure oscillations of hydrodynamic origin in a solid propellant thruster, wherein a three-dimensional effect is generated on the flow to prevent axisymmetric turbulent modes forming, by placing an insert in the thruster transversely relative to a combustion gas flow channel formed in the thruster, said insert having a single opening of non-axisymmetric shape that is different from the shape of the gas flow channel.

In particular implementations, the non-axisymmetric opening of the insert may be in the form of a star or of crenellations.

The three-dimensional effect of the insert on the flow can be produced from the beginning of firing or from a given instant after initial firing by implementing the particular means described above when describing the system of the invention.

Similarly, various particular arrangements of the insert in the thruster as a function of the configuration of the propellant charge are possible as described above for the system of the invention.

BRIEF DESCRIPTION OF THE DRAWINGS

Other characteristics and advantages of the invention appear from the following description of particular embodiments of the invention given as non-limiting examples, with reference to the accompanying drawings, in which.

DETAILED DESCRIPTION OF THE INVENTION

Figure 1:
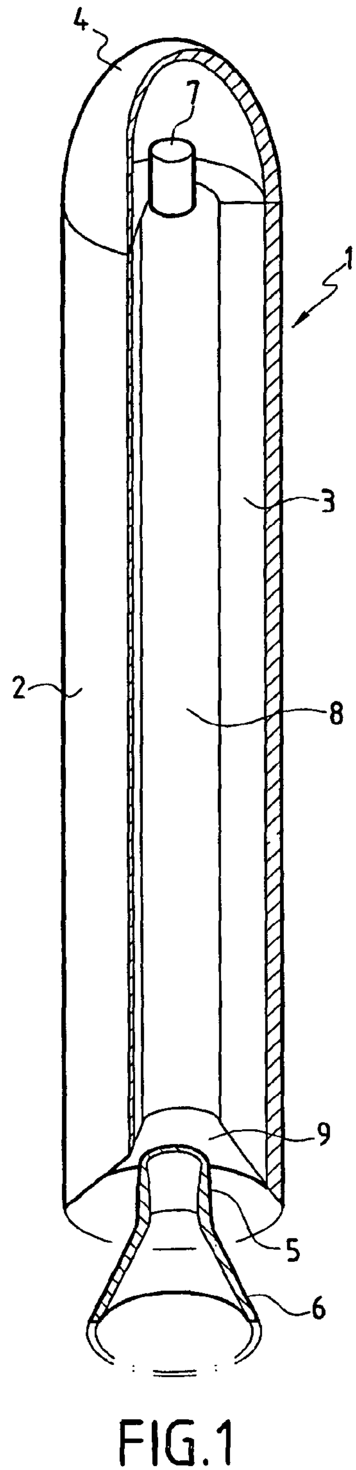
FIG. 1 is a section view of an example of a solid propellant thruster.

FIG. 1 shows a solid propellant thruster 1 comprising a body 2 having two ends: a front end 4 and a rear end 9 in communication with a nozzle 5 extended by a diverging portion 6 for ejecting combustion gases. The thruster body 2 contains a solid propellant charge 3 which is cast in the form of one or more blocks inside the body 2. Combustion of the solid propellant is initiated by an ignitor 7 located at the front end of the solid propellant charge. A channel 8 extends longitudinally inside the thruster so as to allow combustion gases to flow. Combustion of the propellant block begins throughout the entire length of the body 2 from the front to the rear of the thruster, including inside the channel 8.

In general, the nature of the flow inside the combustion chamber is complex. Initially, flow is radial on the surface of the propellant block in combustion and it subsequently becomes longitudinal along the flow channel 8 prior to interacting with the outlet nozzle 5.

Figure 2:
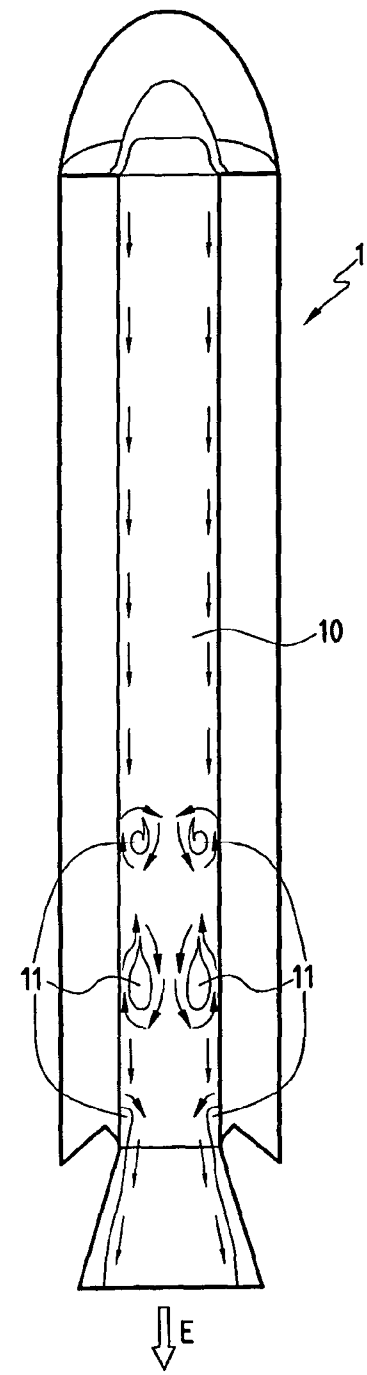
FIG. 2 is a diagram showing the axisymmetric turbulence generated in a solid propellant thruster.

As shown in FIG. 2, while combustion is taking place, a flow 10 is established from upstream to downstream as indicated by arrow E. During this combustion, structural elements of the engine or particular features of the propellant act on the flow and give rise to separation of turbulence. Axisymmetric vortices 11 are then generated inside the thruster while the flow is traveling along the channel. These vortices give rise to pressure oscillations inside the engine by mechanisms that are explained below with reference to FIG. 4.

This defines a type of instability which is taken into consideration in the context of the present invention, i.e. longitudinal acoustic modes that are excited by longitudinal hydrodynamic instability of the flow. Even if the field of application may appear, a priori, to be restricted, particularly with respect to tangential, radial, or cavity modes, it nevertheless covers the majority of instability problems that are countered in large solid propellant thrusters such as the present boosters of Ariane 5, the United States space shuttle, or the Titan launcher.

The present invention is the result of analyzing and understanding the nature of the unstable process.

Figure 3:
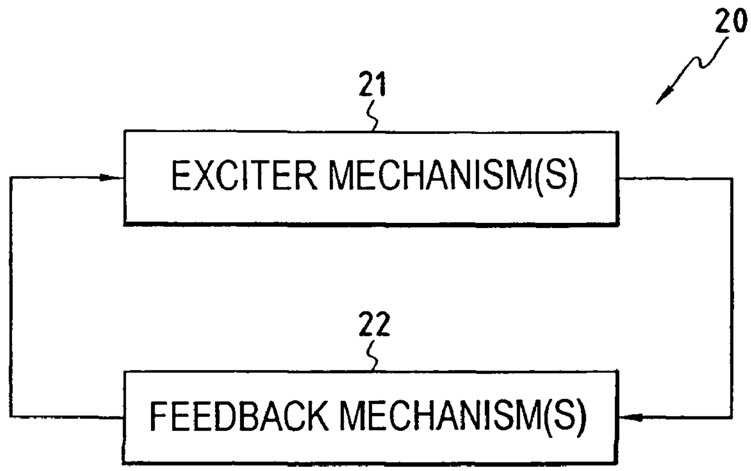
FIG. 3 is a block diagram of a closed loop system that can become unstable.
Figure 4:
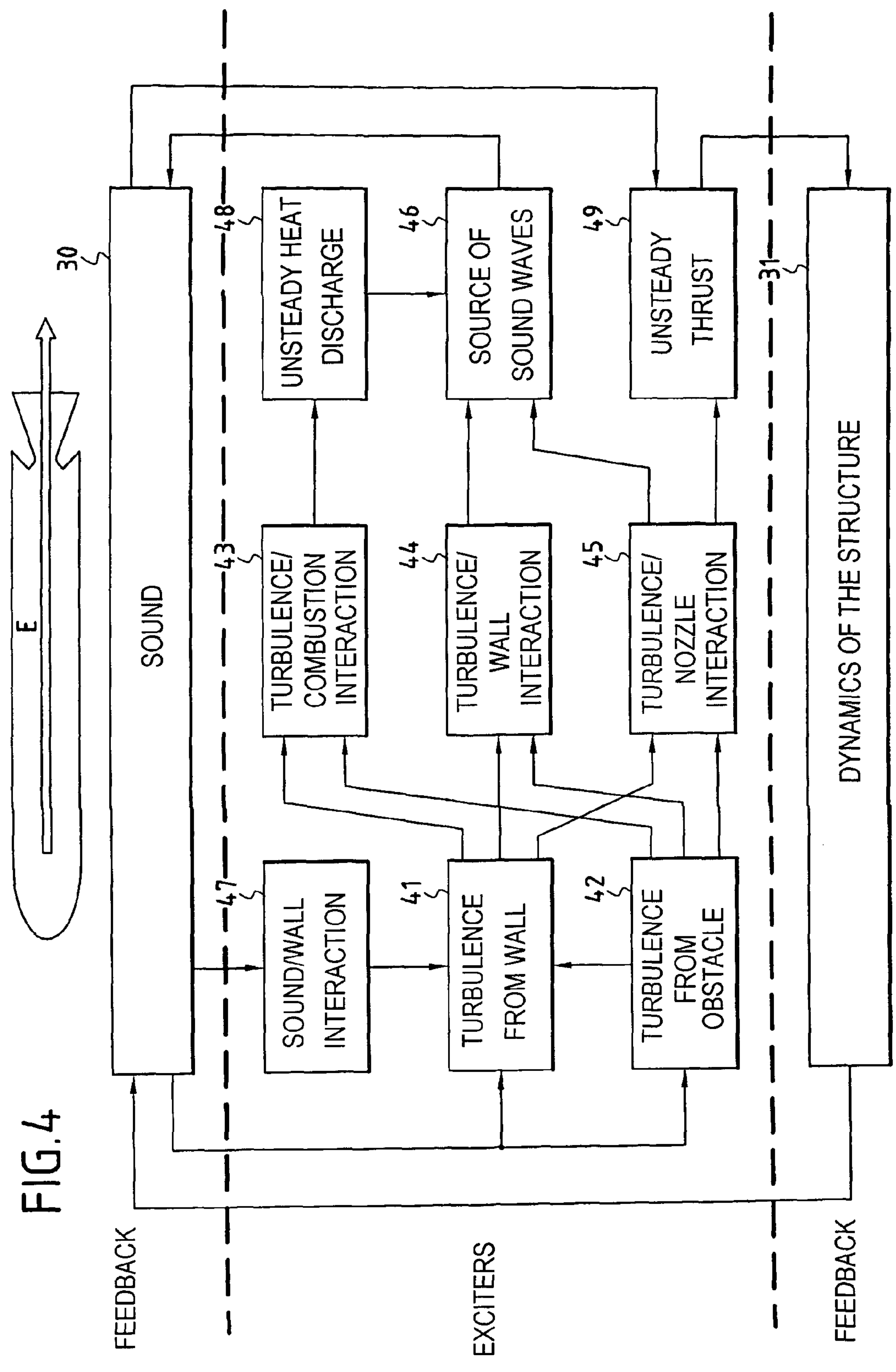
FIG. 4 is a more detailed block diagram corresponding to FIG. 3 showing the mechanisms that can arise in the unstable system considered in the context of the present invention.

FIG. 3 is a basic block diagram of a system that can be unstable. Such a system can be represented by a closed loop 20 constituted by one or more exciter mechanisms 21 and one or more feedback mechanisms 22. If the mechanisms 21 and 22 interact constructively, i.e. if they present appropriate phase relationships and sufficient amplitudes, then instability is self-maintaining (resonance) and leads to levels of oscillation that can be large. FIG. 4 corresponds to a detailed model of the unstable system of FIG. 3 described in terms of physical mechanisms liable to occur for the type of instability under consideration in the present invention, i.e. longitudinal hydrodynamic instability in a flow. Blocks 30 and 31 represent feedback mechanisms present for the case of a longitudinal mode. These mechanisms allow looping to occur in the thruster by causing disturbances to rise from downstream to upstream. As illustrated in these blocks 30 and 31 respectively, the feedback can be initiated by soundwaves (block 30) or by vibration transmitted through the structure (block 31).

The exciter mechanisms are represented by blocks 41 to 49 which should be taken into consideration in the flow direction E from upstream to downstream in the engine, beginning with the blocks 41 and 42 which correspond to the emission sources at the origin of the excitation. These sources are formed by turbulence separating either from the wall of the propellant (block 41) or from an inert obstacle in the flow or a corner of the propellant (block 42). These various types of turbulence emission can coexist.

The generated turbulence re-injects energy into the feedback mechanisms via a variety of interactions. These interactions may be interactions between the turbulence and combustion (block 43) leading to heat being given off in unsteady manner (block 48) which is a source of sound energy (block 46), interactions between turbulence and the wall of the thruster (block 44) which are likewise a source of sound energy (block 46), or indeed interactions between turbulence and the nozzle (block 45) comprising simultaneously sources of sound energy (block 46) and of unsteady thrust (block 49). Finally, the sound generated by those phenomena taken together can also contribute to re-injecting energy into the dynamic behavior of the structure. The sound field also generates unsteady thrust.

Instability can exist in the thruster without that involving all of the physical mechanisms mentioned above. All that is necessary for causing instability to appear is that a loop should be closed via one of the proposed paths, and that it should have appropriate phase and amplitude relationships between the various mechanisms.

Consequently, having regard to the FIG. 4 model of the unstable system, it can be deduced that instability can be controlled in various ways. More precisely, action can be based on three main principles. The first consists in "breaking" the constructive phase relationships between the mechanisms, for example by modifying the mechanical resonant modes of the thruster if this is the mechanism involved. A second principle can be based on limiting the amplitude of one of the mechanisms in a loop, for example by using damper or absorber devices. Finally, the third principle consists in eliminating the exciter mechanism(s), by acting on the source(s) of instability.

Given this determination of the principles on which control might be based, the principle retained by the invention serves to control the instability in question while minimizing structural modifications to the thruster and minimizing the risks of some other instability appearing. In addition, in order to avoid spoiling the performance of the engine, and for reasons of reliability, the control system implemented by the invention is based on passive elements.

Thus, although controlling instability involves modifying the thruster, the impact of the modification should be as limited as possible in terms of thruster manufacture and also in terms of thruster performance. Furthermore, the control means implemented should not themselves give rise to some other instability appearing that might be more harmful to the engine than the instability that is being eliminated. It is important to emphasize the concept of the robustness of the control principle selected in the context of the present invention. For example, a passive system for controlling pressure oscillations in the first longitudinal acoustic mode of an engine must be absolutely certain of avoiding exciting the second and third modes of the engine given the problems of coupling with the structural elements of the engine.

Thus, the control principle of the invention has been selected on the basis of the analysis of FIGS. 2, 3, and 4 while taking account of the above-described requirements. This principle consists in "breaking" the instability loop by preventing axisymmetric turbulent modes being created, i.e. by preventing turbulence separating from the wall of the engine, from inert obstacles in the flow, or from corners in the propellant (blocks 41 and 42 in FIG. 4). Action is thus being taken on an unavoidable element in the instability loop. These turbulent modes constitute an unavoidable portion in all of the possible loop paths.

The solution of the present invention thus consists in inserting a device of suitable shape into the flow, said device establishing a three-dimensional effect on the flow so as to prevent development of the axisymmetric turbulent mode. Although the device which generates the three-dimensional effect may be anywhere within the engine, it is preferably located close to those zones of the engine where the turbulence that constitutes the source of instability is itself generated.

Figure 8:
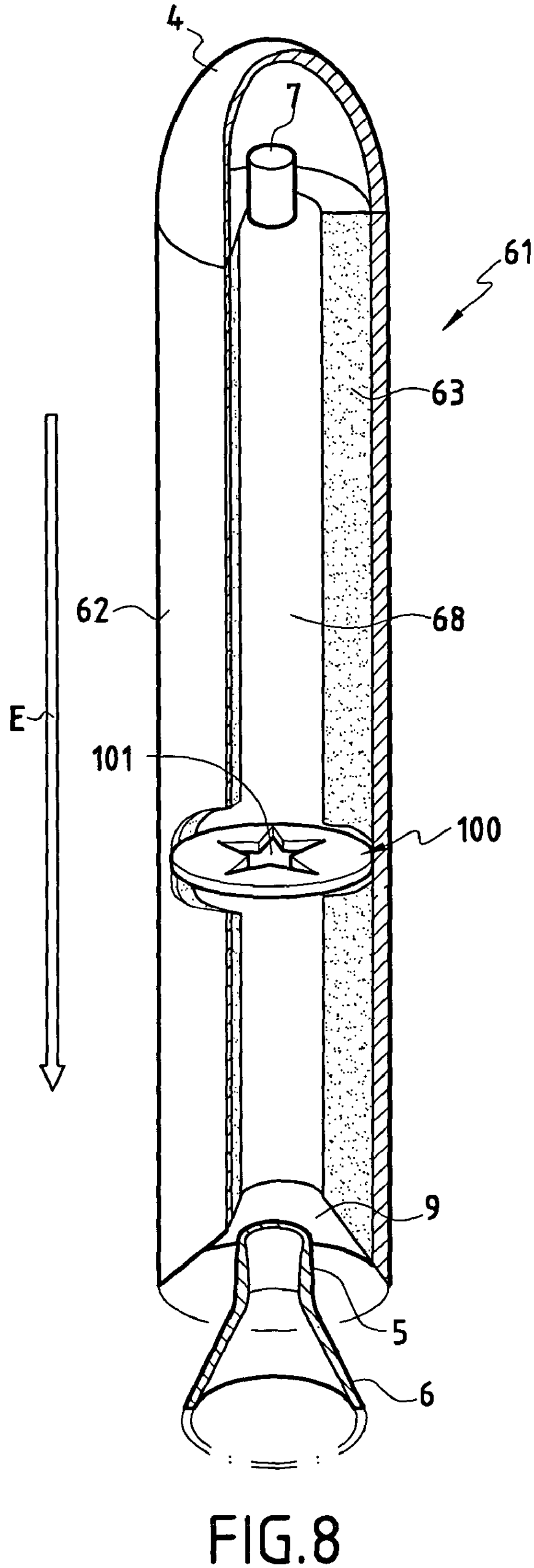
FIG. 8 is a section view of a solid propellant thruster fitted with the FIG. 5 insert in an embodiment of the invention.

This three-dimensional effect can be obtained by interposing an insert in the flow as shown in FIG. 8 where there can be seen a thruster 61 comprising a body 62 containing a solid propellant charge 63 defining a gas flow channel 68 with an insert 100 disposed therein, the insert having a stationary non-axisymmetric opening 101. The non-axisymmetric opening 101 of the insert 100 generates a three-dimensional effect on the flow E which breaks the coherence of the axisymmetric turbulent mode that is involved in instability.

Figure 5:
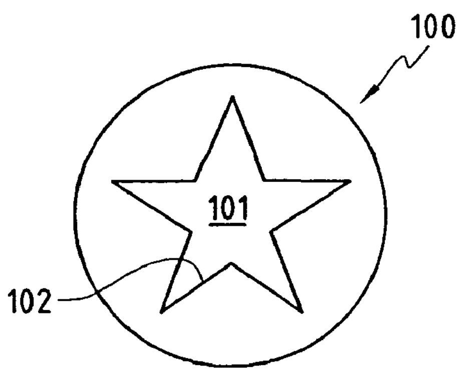
FIG. 5 is a face view of a first embodiment of an insert of the invention.
Figure 6:
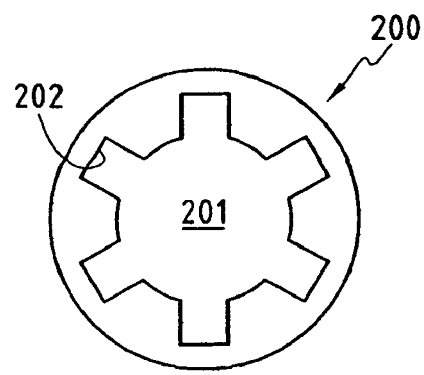
FIG. 6 is a front view of a second embodiment of an insert of the invention.

The insert of the invention may present an opening of various shapes. FIG. 5 shows a first embodiment of an insert 100 of the invention. The insert 100 presents an opening 101 that is in the shape of a star 102. FIG. 6 shows a second embodiment of an insert 200 in which the opening 201 has crenellations 202. Thus, the projecting portions that are present in the openings 101 and 201 disturb the symmetry of the flow.

These examples of inserts are not exhaustive of the shapes of opening that can be provided in an insert of the invention. More generally, any insert having an opening of non-axisymmetric shape is potentially capable of creating a three-dimensional effect on the flow that is suitable for breaking its symmetry and preventing any axisymmetric turbulence from forming. The particular non-axisymmetric shape that is selected for the opening will depend on the degree of effectiveness that is desired for the three-dimensional effect on the flow, and also on the technology involved.

In order to disturb the gas flow by creating a three-dimensional effect thereon, the non-axisymmetric opening of the insert must be of a shape that is different from the shape of the gas flow channel. In order to break the symmetry of the flow, it is necessary for at least a portion of the non-axisymmetric opening to appear in the gas flow channel, thereby preventing axisymmetric turbulence forming without creating a constriction in the flow which would increase pressure in the upstream portion of the thruster. In FIG. 8 for example, the opening 101 of the insert 100 is star-shaped, while the gas flow channel 68 is cylindrical in shape. Prior art solutions, such as that described in U.S. Pat. No. 3,795,106, which consists in interposing, in the thruster, an insert having an opening that is identical in shape to the opening of the gas flow channel, are not satisfactory concerning the problem of pressure oscillations of hydrodynamic origin as observed in the present invention. Such openings do not enable flow symmetry to be broken, and in general they create a constriction in the flow which increases pressure upstream, and therefore requires the top portion of the thruster to be reinforced.

The three-dimensional effect generated by the insert can be implemented throughout firing, or only from a given instant after initial firing.

In the first case, the non-axisymmetric opening of the insert is present in the flow channel from the beginning of firing. The insert may then be made of a "rigidimer" composite material, i.e. a rigid reinforced elastomer composite material.

In the second case, the three-dimensional effect is not generated from the beginning of firing. In many cases, it is found that pressure oscillations begin to appear only after a given instant while the engine is in operation. Consequently, inserts can be used in which the three-dimensional effect becomes operational only from some determined instant after the beginning of firing, when the observed instability is liable to appear. The effect then persists until the end of firing or at least over a period corresponding to the range in which instability appears. The present invention proposes a plurality of techniques for temporarily masking the non-axisymmetric opening in the insert at the beginning of firing so as to inhibit the three-dimensional effect temporarily.

A first technique consists in using a portion (one-piece propellant charge) or a block (propellant charge segmented into a plurality of blocks) of propellant upstream from the insert in the thruster, the upstream portion or block defining a flow channel of initial diameter that is inscribed completely within the opening of the three-dimensional effect insert. Thus, at the beginning of combustion, the three-dimensional effect of the insert located downstream is ineffective. The initial diameter of the flow channel in the block of propellant masks the non-axisymmetric shape of the opening in the insert. After combustion has been in progress for a certain length of time, the block is consumed radially, thereby progressively revealing the non-axisymmetric shape of the opening in the insert. The three-dimensional effect then becomes effective and begins to influence the flow.

Figure 7A:
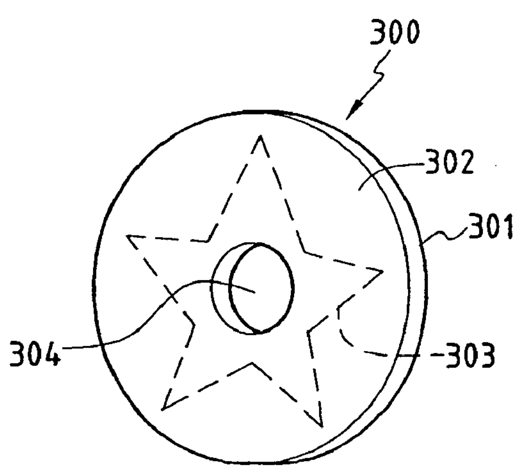
FIGS. 7A and 7B are perspective views showing how the shape of a two-composition insert changes during firing in a third embodiment of the invention.
Figure 7B:
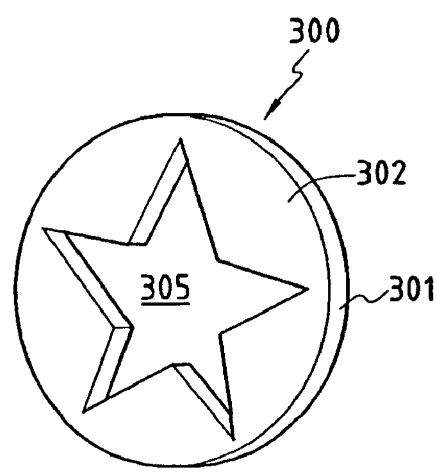

In another technique, the non-axisymmetric opening of the insert may be masked temporarily at the beginning of firing by means of an insert whose opening varies in shape. More precisely, in accordance with the invention, the insert at the beginning of firing is of a shape that is axisymmetric, and subsequently, from a determined instant, it reveals a non-axisymmetric opening by virtue of its shape changing while firing is taking place. For this purpose, a first embodiment in accordance with the present invention consists in making a dual-composition insert with controlled ablation or erosion. FIGS. 7A and 7B show how such an insert operates. FIG. 7A shows an insert 300 in its initial shape that is suitable for the beginning of firing. The insert 300 comprises a disk 301 made up of two portions 302 and 303 made of different materials (dual composition). In this configuration, the insert 300 presents a circular opening 304 (i.e. an opening that is axisymmetric) so as to allow the flow to pass through without any three-dimensional effect. The portion 303 (drawn in dashed lines) of the disk is made of an "ablation" material (i.e. a material that is destroyed progressively by decomposing, melting, eroding, subliming, or vaporizing). Thus, during firing, the material constituting the portion 303 is consumed, e.g. by chemical erosion with the combustion gases, more quickly than is the material constituting the portion 302, thereby giving rise to an insert having the new shape shown in FIG. 7B. In this figure, only the portion 302 of the insert 300 remains, the portion 303 having been completely consumed. At this moment, the disk 301 presents an opening 305 of a shape, in this case a five-branched star, that will produce a three-dimensional effect on the flow so as to prevent an axisymmetric turbulent mode from forming. The material constituting the portion 303 is selected as a function of its speed of ablation so that the opening 305 appears at the same time as the three-dimensional effect needs to be implemented, i.e. at the moment when the instability associated with axisymmetric turbulent modes appears. As with the inserts described above in which the shape of the opening does not vary, the shapes that can be envisaged for the portion 303 initially partially occupying the opening 305 can be various, providing they are not axisymmetric.

Still on the principle of the shape of the insert varying while firing is taking place, the appearance of the non-axisymmetric opening can be obtained during firing by means of an insert that breaks mechanically in controlled manner. For this purpose, the portion of the insert such as the portion 303 in FIG. 7A that needs to be removed during firing in order to reveal the non-axisymmetric opening can be of smaller thickness that the remainder of the insert. Similarly, the portion 303 can be made more easily detachable by weakening the structure, for example by punching along the boundary between said portion and the remainder of the insert.

The material with a high speed of ablation used to form the consumable portions in the insert, such as the portion 303 in FIG. 7A, may be made, for example, of an elastomer composite type material.

For the inserts or insert portions that are to remain longer in position, it is possible to use a reinforced elastomer or thermostructural "rigidimer" composite type material.

The present invention proposes a technique which can be adapted to any solid propellant engine which presents the instabilities to which the invention applies, and this can be done without significantly modifying performance thereof.

Figure 9A:
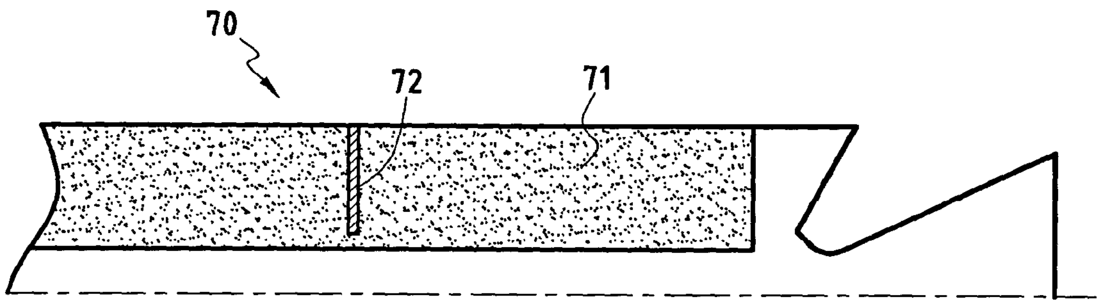
FIG. 9A is an axial half-section view of a portion of a thruster showing one example of an arrangement in accordance with the invention of an insert in a thruster having a one-piece propellant charge.
Figure 9B:
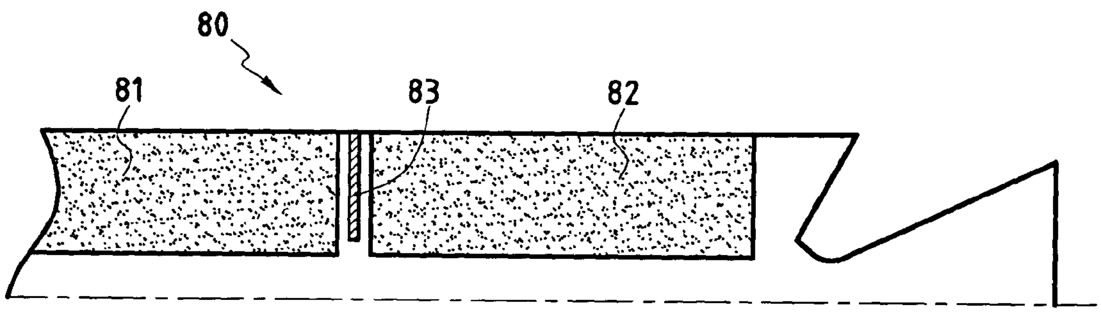
FIG. 9B is an axial half-section view of a portion of a thruster showing a first example of an arrangement in accordance with the invention of an insert in a thruster having a segmented propellant charge.
Figure 9C:
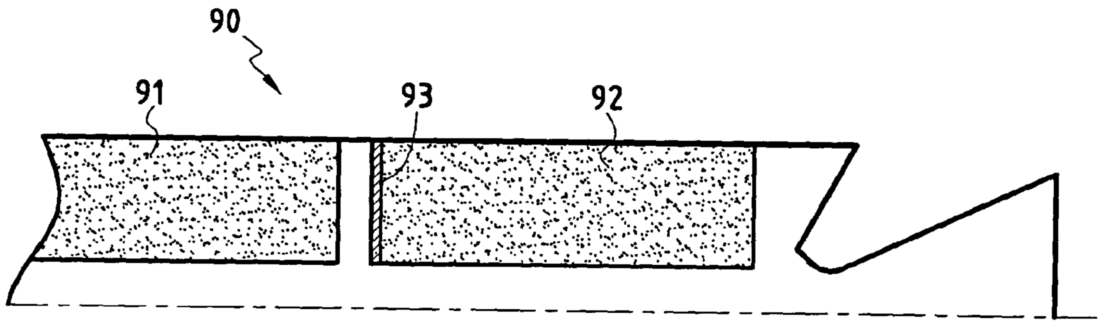
FIG. 9C is an axial half-section view of a portion of a thruster showing a second example of an arrangement of an insert in accordance with the invention in a thruster having a segmented propellant charge.

FIGS. 9A, 9B, and 9C show examples of how the device of the invention can be integrated.

In FIG. 9A, a thruster 70 comprises a propellant charge constituted by a single block 71. In this thruster having a single block propellant charge, an insert 72 is integrated in the block 71. In this case, the shape of the insert can be fixed, i.e. it can present an opening that is not axisymmetric from the beginning, the opening being present in the flow from the beginning of firing or appearing at a given instant as the block of propellant is consumed radially. Alternatively, the three-dimensional effect of the insert can become operational only from a determined instant after initial firing by using an insert of shape that varies due to ablation or controlled mechanical rupture, as described above.

FIG. 9B shows a thruster 80 having a propellant charge segmented into at least two blocks 81 and 82. In this type of thruster, an insert 83 can be disposed between the two blocks 81 and 82 in the inter-segment space. The shape of the insert 83 can be fixed and possibly temporarily masked prior to the block of propellant 81 being consumed radially. Alternatively, the three-dimensional effect of the insert may become operational only after a given instant by using an insert of shape that varies due to ablation or to controlled mechanical rupture as described above.

FIG. 9C relates to a thruster 90 having a segmented propellant charge comprising a plurality of blocks 91 and 92, with at least one block (in this case the block 92) being inhibited in order to protect it from combustion. The inhibited block 92 thus carries front thermal protection means disposed on its front face. In an advantageous application of the invention, an insert 93 may be placed on the top face of said block replacing the thermal protection means so as to act simultaneously in providing thermal protection (inhibiting the block) and in reducing pressure oscillations. In this type of application, it is preferable to use an insert of shape that varies since, a priori, the shape of the inhibited block is different from a non-axisymmetric shape desired for controlling pressure oscillations.

Thus, the invention proposes a passive control system that is relatively simple, making it possible in reliable manner to guarantee that longitudinal hydrodynamic instability will be absent from the flow. The system proposed presents a high degree of robustness since it acts directly on the source of the instability, i.e. the emission of axisymmetric turbulence which occurs in large solid propellant thrusters. In addition, it is relatively easy to apply the invention in existing engines because of the variety of techniques enabling the insert to be integrated in the charge and the various options proposed for implementing the three-dimensional effect.

What is claimed is:

1. A system for passively controlling pressure oscillations of hydrodynamic origin in a solid propellant thruster comprising a body containing a charge of solid propellant, the system comprising at least one insert disposed in said thruster body transversely relative to a combustion gas flow channel formed in the solid propellant charge, said insert including a single opening of non-axisymmetric shape that is different from the shape of the gas flow channel so as to generate a three-dimensional effect on the flow in order to prevent axisymmetric turbulent modes from forming in the thruster.

2. A system according to claim 1, wherein said non-axisymmetric opening of the insert is present in the flow channel throughout the duration of the combustion of the solid propellant charge.

3. A system according to claim 2, wherein the insert is made of a "rigidimer" composite material.

4. A system according to claim 1, wherein said non-axisymmetric opening of the insert appears in the flow channel from a predetermined instant of the combustion of the solid propellant charge.

5. A system according to claim 4, wherein the insert has an opening of shape that varies from a shape that is axisymmetric at the beginning of combustion to a shape that is not axisymmetric as from a predetermined instant of combustion.

6. A system according to claim 5, wherein the insert of varying shape comprises a first portion constituted by a first material and a second portion constituted by a second material and occupying part of the non-axisymmetric opening of the insert, said second material having a speed of ablation that is faster than that of the first material.

7. A system according to claim 6, wherein said insert is made of an elastomer composite material or of a composite material comprising both elastomer and "rigidimer".

8. A system according to claim 5, wherein the insert of varying shape comprises a first portion and a second portion occupying part of the non-axisymmetric opening of the insert, said second portion being weaker than said first portion.

9. A system according to claim 4, wherein a portion of the propellant charge placed upstream from the insert having a non-axisymmetric opening presents a flow channel with an initial diameter that is inscribed within the non-axisymmetric opening of said insert.

10. A system according to claim 1, wherein the thruster body contains a single block of solid propellant, the insert with a non-axisymmetric opening being disposed within said block.

11. A system according to claim 1, wherein the thruster body contains a propellant charge that is segmented into a plurality of blocks, and the insert having a non-axisymmetric opening is disposed in the inter-segment space that exists between two successive blocks.

12. A system according to claim 1, wherein the thruster body contains a propellant charge that is segmented into a plurality of blocks, with at least one of the blocks being inhibited, the insert having a non-axisymmetric opening being disposed on the top face of the inhibited block.

13. A system according to claim 1, wherein said opening of the insert is in the shape of a star.

14. A system according to claim 1, wherein said opening is in the shape of crenellations.

15. A method of controlling pressure oscillations of hydrodynamic origin in a solid propellant thruster, wherein a three-dimensional effect is generated on the flow to prevent axisymmetric turbulent modes forming, by placing an insert in the thruster transversely relative to a combustion gas flow channel formed in the thruster, said insert having a single opening of non-axisymmetric shape that is different from the shape of the gas flow channel.

16. A method according to claim 15, wherein the three-dimensional effect on the flow is generated throughout the duration of the combustion of the solid propellant charge.

17. A method according to claim 15, wherein the three-dimensional effect on the flow is generated from a predetermined instant of the combustion of the solid propellant charge.

18. A method according to claim 17, wherein the three-dimensional effect on the flow is generated from a predetermined instant by means of an insert having an opening of shape that varies from an axisymmetric shape at the beginning of combustion to a non-axisymmetric shape at a predetermined instant of combustion.

19. A method according to claim 18, wherein the insert of varying shape comprises a first portion constituted by a first material and a second portion constituted by a second material and occupying part of the non-axisymmetric opening of the insert, said second material having a speed of ablation that is greater than that of the first material.

20. A method according to claim 18, wherein the insert of varying shape comprises a first portion and a second portion occupying part of the non-axisymmetric opening of the insert, said second portion being weaker than said first portion.

21. A method according to claim 17, wherein the three-dimensional effect on the flow is generated from a predetermined instant of the combustion by means of a portion of the propellant charge placed upstream from the insert having a non-axisymmetric opening and presenting a flow channel of an initial diameter that is inscribed in the non-axisymmetric opening of said insert.

22. A method according to claim 15, wherein the thruster body contains a single block of solid propellant, the insert having a non-axisymmetric opening being disposed inside the block.

23. A method according to claim 15, wherein the thruster body contains a propellant charge that is segmented into a plurality of blocks, the insert having a non-axisymmetric opening being disposed in the inter-segment space that exists between two successive blocks.

24. A method according to claim 15, wherein the thruster body contains a propellant charge that is segmented into a plurality of blocks including at least one block that is inhibited, the inset having a non-axisymmetric opening being disposed on the top face of the inhibited block.

25. A method according to claim 15, wherein said opening in the insert is in the shape of a star.

26. A method according to claim 15, wherein said opening in the insert is in the form of crenellations.

* * * * *